(12) United States Patent
Muren

(10) Patent No.: US 9,174,729 B2
(45) Date of Patent: Nov. 3, 2015

(54) ROTOR ASSEMBLY

(75) Inventor: Petter Muren, Nesbru (NO)

(73) Assignee: Prox Dynamics AS, Nesbru (NO)

( * ) Notice: Subject to any disclaimer, the term of this patent is extended or adjusted under 35 U.S.C. 154(b) by 744 days.

(21) Appl. No.: 13/509,629

(22) PCT Filed: Dec. 15, 2010

(86) PCT No.: PCT/NO2010/000466
§ 371 (c)(1),
(2), (4) Date: May 14, 2012

(87) PCT Pub. No.: WO2011/078684
PCT Pub. Date: Jun. 30, 2011

(65) Prior Publication Data
US 2012/0282103 A1 Nov. 8, 2012

(30) Foreign Application Priority Data
Dec. 24, 2009 (NO) .................................. 20093594

(51) Int. Cl.
*B64C 27/605* (2006.01)
*B64C 27/68* (2006.01)

(52) U.S. Cl.
CPC ............... *B64C 27/605* (2013.01); *B64C 27/68* (2013.01)

(58) Field of Classification Search
CPC ...... B64C 27/68; B64C 27/605; B64C 27/52; B64C 27/625; B64C 27/72; B64C 11/06; B64C 11/30; B64C 11/44; B64C 2027/7238; B64C 2027/7255
See application file for complete search history.

(56) References Cited

U.S. PATENT DOCUMENTS

| 5,188,512 A | 2/1993 | Thornton |
| 2009/0214340 A1* | 8/2009 | Berthie ........................... 416/24 |
| 2010/0084517 A1* | 4/2010 | Benson et al. ................. 244/228 |

FOREIGN PATENT DOCUMENTS

DE           10125734 A1    9/2002

OTHER PUBLICATIONS

International Search Report dated Jan. 7, 2011 for International Application Serial No. PCT/NO2010/000466, International Filing Date: Dec. 15, 2010 consisting of 4-pages.

* cited by examiner

*Primary Examiner* — Edward Look
*Assistant Examiner* — Juan G Flores
(74) *Attorney, Agent, or Firm* — Christopher & Weisberg, P.A.

(57) ABSTRACT

A rotor assembly for helicopter vehicles for providing an easy way of controlling pitch, roll and lift of the aircraft by respective servo actuators. The rotor assembly has a rotor shaft, at least two rotor blades, a rotor head, and a non-rotating swash plate. The rotor assembly also includes a pitch hinge for each rotor blade connecting each rotor blade to the rotor head. The rotor assembly also includes a guide member for each rotor blade. As the rotor assembly rotates, the guide members are in substantial contact with an upper surface of the non-rotating swash plate. Forces such as magnetic and/or an aerodynamic forces are applied on the rotor blades and are sufficiently strong to create a valve effect on the pitch hinge, which in turn maintains contact between the guide members and the non-rotating swash plate.

10 Claims, 4 Drawing Sheets

ROTOR ASSEMBLY

This application is a U.S. National Stage application of and claims priority to International Application No. PCT/NO2010/000466, entitled ROTOR ASSEMBLY, filed Dec. 15, 2010, which claims priority from Norwegian App. No. NO20093594, entitled ROTOR ASSEMBLY, filed on Dec. 24, 2009, the entirety of all of which is incorporated herein by reference.

FIELD OF THE INVENTION

The present invention relates to a rotor assembly for controlling pitch, roll and lift of a helicopter vehicle and aircraft.

BACKGROUND OF THE INVENTION

Typically, rotary wing aircrafts like helicopters are sustained by a rotor, rotating about a vertical rotor shaft, generating lift or upward thrust. In a conventional helicopter the thrust from the rotor can be controlled by changing the pitch angle (or in short; the blade pitch) of the rotor blades. The blade pitch is in the field of propeller aerodynamics defined as the lateral angle between the blades and a reference plane perpendicular to the rotor shaft axis, measured perpendicular to the longitudinal axis of a rotor blade.

By collectively changing the blade pitch of all the rotor blades or by changing the rotational speed of the rotor, the helicopter can be controlled in the vertical direction. The horizontal direction of flight and the stability of the helicopter, however, are controlled by cyclically adjusting the pitch means that the blade pitch of each rotor blade is adjusted from a maximum in a particular position of rotation to a minimum at the opposite side. This causes the lift in one part of the rotation to be larger than in other parts, whereby the rotor is tilted with respect to the reference plane. When the rotor (and helicopter) tilts like this, the initially vertical thrust also tilts, and therefore gets a horizontal component pulling the helicopter in the desired direction.

Normally, a helicopter must be actively controlled by a well trained pilot or from gyroscopic sensors and computers. The necessary means to varying and controlling the pitch angle of each blade are normally complicated, expensive and add weight to the helicopter. The blade pitch is typically controlled via a swash plate connected to servos. Because the swash plate need to be positioned accurately with as little friction and playas possible it is complicated and expensive. On most helicopters the swash plate has a rotating part and a non-rotating part connected together with a large ball bearing. The rotating part of the swash plate is again connected to the rotor blades via a set of links and other mechanical components.

Alternative solutions employing actuators connected to rotor blade control surfaces or magnetic coil systems acting directly on a permanent magnet mounted on a rotor blade pitch arm have been tested. These systems are typically not precise enough and lack the necessary accuracy or they are heavy and require a lot of power to operate properly.

To maintain good and precise control over the rotor blade in a helicopter would require a completely new swash plate system.

SUMMARY OF THE INVENTION

The present invention provides a rotor assembly adjusted to rotate in a certain rotational direction, having a rotor shaft and at least two rotor blades coupled to a rotor head which in turn is connected to the rotor shaft, the rotor blades extending outwards from the rotor shaft, the rotor assembly further comprising a non-rotating swash plate through which, centre the rotor shaft runs, being adjusted to tilt around all, of its radial axis, a respective pitch hinge for each rotor blade connecting said respective rotor blade to the rotor head wherein a hinge axis which the pitch hinge rotates around is generally parallel to and is positioned in front of the longitudinal centre axis of the respective rotor blade in the rotational direction, and a respective guide member for each rotor blade connected to an inner blade tip of which, said inner blade tip being positioned in front of the hinge axis in the rotational direction and said guide member being adjusted to follow an upper surface of the non-rotating swash plate when the rotor assembly rotates, wherein one or more forces are applied on the rotor blades sufficiently strong to create a valve effect on the pitch hinge pressing the guide members downwards against the non-rotating swash plate, whereby movements of the non-rotating swash plate are transferred to blade pitch movements of the rotor blades.

BRIEF DESCRIPTION OF THE DRAWINGS

The following detailed description of the preferred embodiment is accompanied by drawings in order to make it more readily understandable. In the drawings.

DETAILED DESCRIPTION OF THE INVENTION

In the following, the present invention will be discussed and example embodiments described by referring to the accompanying drawings.

The present invention provides a rotor assembly for helicopter vehicles for providing an easy way of controlling pitch, roll and lift of the aircraft by respective servo actuators. Pitch in this context means controlled movements in the forward/backward direction, and roll in the left/right directions of the aircraft. Note that "blade pitch" in this document refers to tilt movements around the longitudinal axis of a rotor blade, and is different to what is referred to as "pitch" only, as described above.

Figure 1:
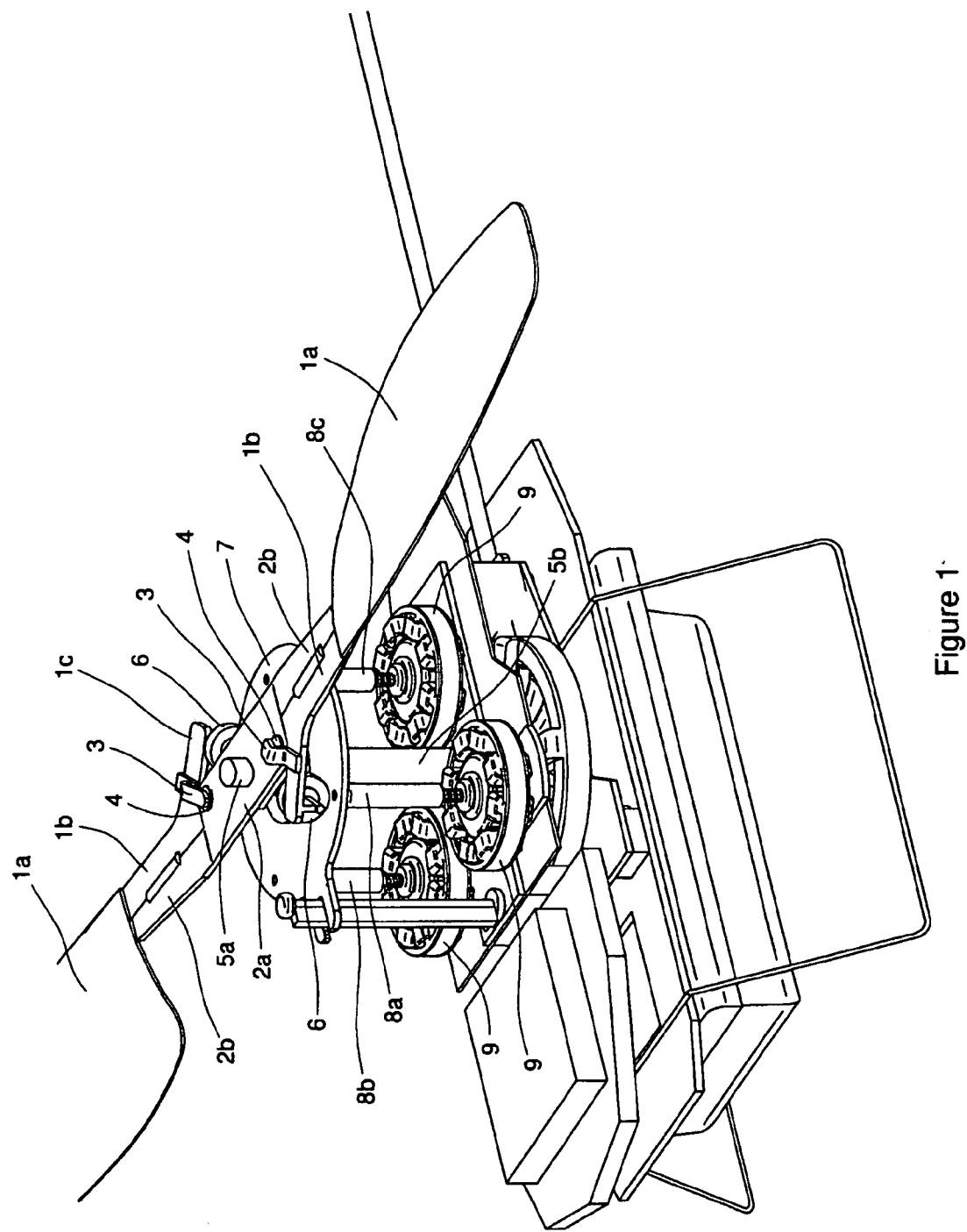
FIGS. 1 and 2 are perspective views of a 2-bladed rotor assembly controlled by three servos according to the present invention.
Figure 2:
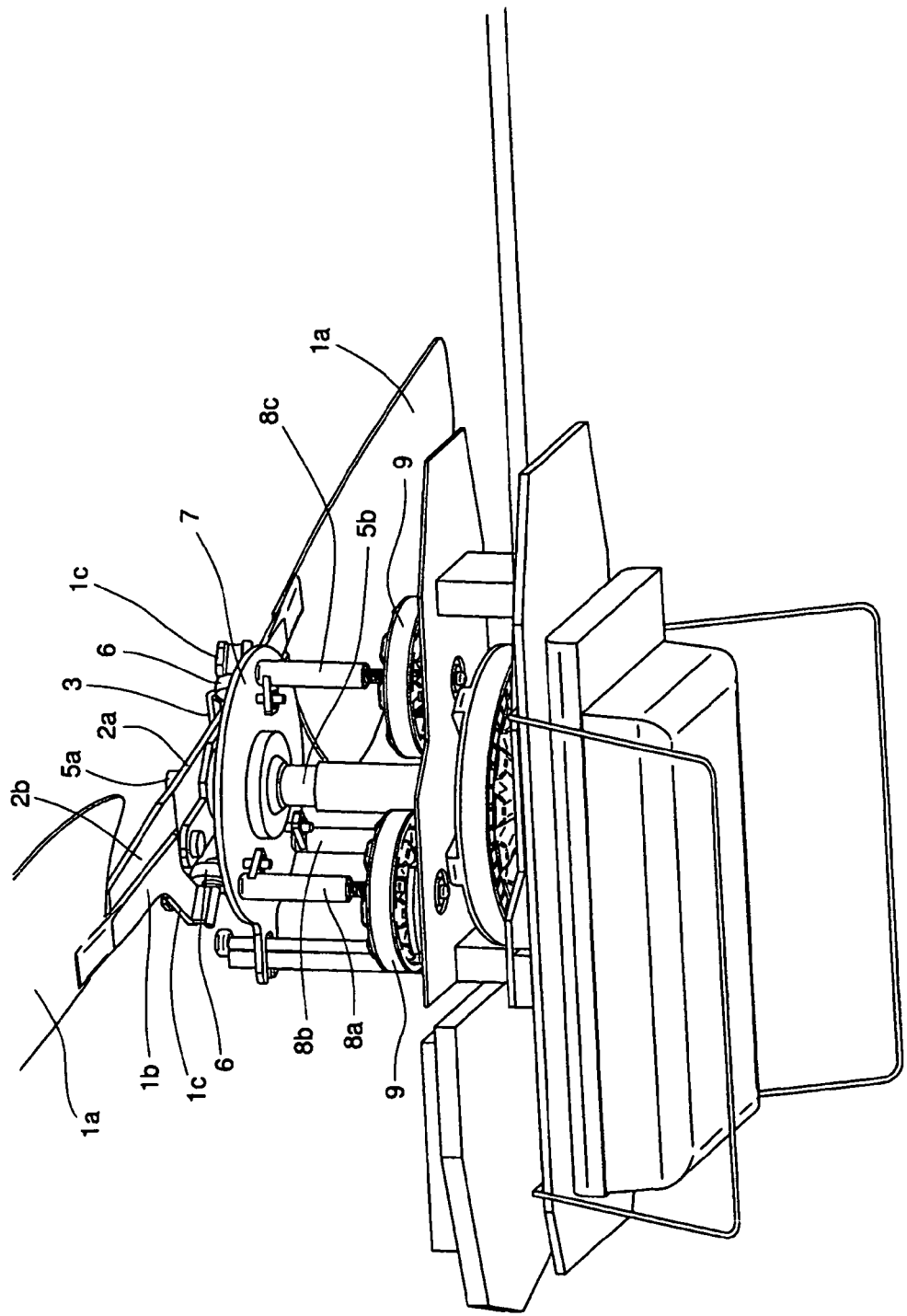
Figure 3A:
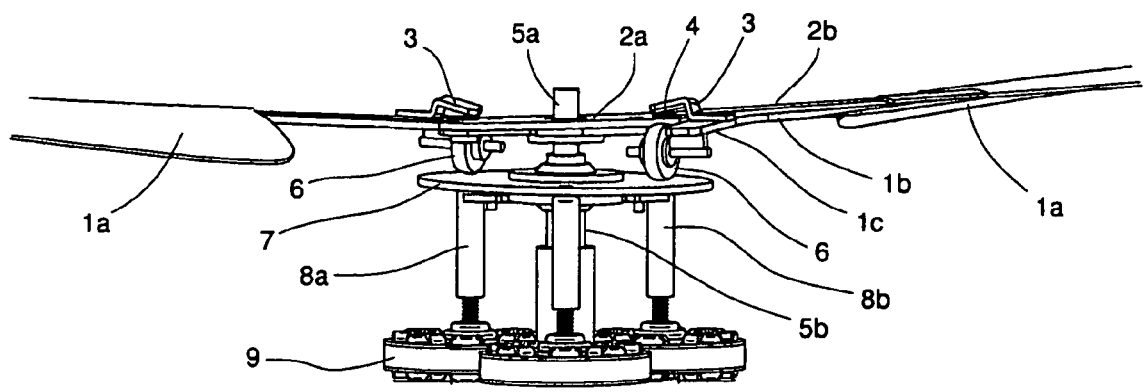
FIGS. 3a and 3b are perspective views of a rotor assembly according to the present invention, showing the relationship between swash plate tilting and blade pitch.
Figure 3B:
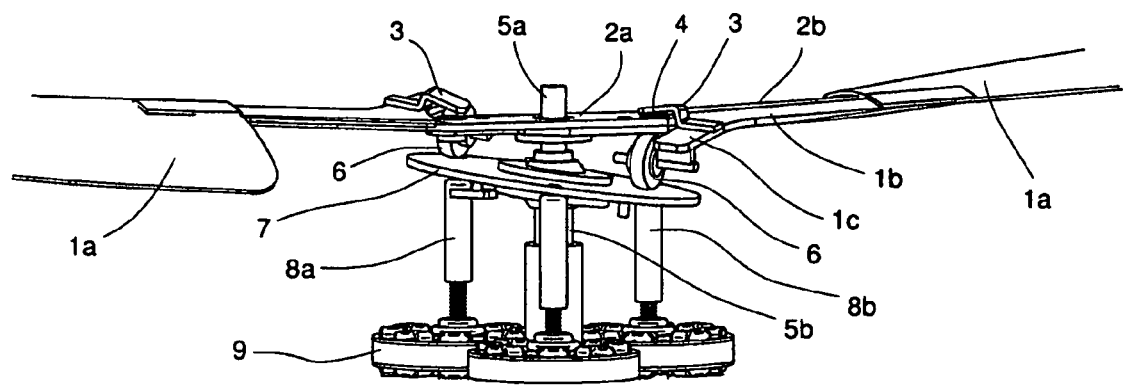

In FIGS. 1 and 2, one embodiment of a rotor assembly according to the present invention is shown. The rotor itself consists of two rotor blades (1) connected to a rotor head (2). The rotor head (2) is mounted to the upper part of a rotor shaft (5a).

Each rotor blade (1) further consists of an airfoil section (1a), a blade hinge part (1b) and an inner blade tip (1c). The rotor head (2) consists of a rotor head inner part (2a) and two rotor head hinge parts (2b). The rotor head hinge part (2b) and the rotor blade hinge part (1b) are substantially of the same size and shape, positioned tightly side-by-side and hinged around an axis being generally parallel to and positioned in front of (direction of the rotating blade) the longitudinal center axis of the airfoil (1a). The rotor head hinge part (2b) and the rotor blade hinge part (1b) then together form a pitch hinge allowing the rotor blade (1) to tilt around an axis extending from the rotor head inner part (2a) to the outer blade tip so as to provide blade pitch movements independently from the rotor head (2) and the other rotor blade (1).

The inner blade tip (1c) is extending inwards and forward (in the direction of the rotating blade) from the inner part of the blade hinge part (1b). It is a continuation of the blade hinge part (1b) but slightly inclined outwards with respect to the longitudinal axis of the rotor blade (1). The inner blade tip (1c) is substantially perpendicular to a radial line extending out from the centre of the rotor head (2). On top of the inner blade tip (1c) close to the inner rotor head (2a), a metal lip (3) is mounted, extending above a disc formed magnetic member. This magnetic disc (4) is mounted on top or integrated in the inner rotor head (2a). The metal lip (3) is provided with a bend or a z-shape so that the part of the metal lip (3) positioned above the magnetic disc (4) lies parallel just upon the magnetic disc (4) when the rotor blade is in a maximum negative blade pitch position.

Wheel (6), is mounted on each of the inner blade tips (1c) so that the wheel plane is parallel to the longitudinal axis of the inner blade tip (1c). The wheel (6) is positioned just outside the metal lip (3), but sufficiently separated to make sure the metal lip (3) does not prevent the wheel (6) from rolling freely. As the longitudinal axis of the inner blade tip (1c) is substantially perpendicular to a radial line extending from the centre of the rotor head (2), the rotational plane of the wheel (6) is also substantially perpendicular to this radial line, to which the rotational axis of the wheel (6) them consequently is generally concurrent. Ideally the rotational axis of the wheel (6) should always pass through the centre of the rotor head (2).

The wheels (6) mounted on the inner blade tips (1c) lies upon a non-rotating swash plate (7). The non-rotating swash plate (7) is positioned so that the wheels (6) can touch the surface of the non-rotating swash plate (7), and can roll freely upon which, hence the wheels (6) function as guide members enabling the inner blade tips (1c) to follow any movements of the non-rotating swash plate (7). The non-rotating swash plate (7) is kept rotationally stationary by one or more bars fixed to the aircraft, but can tilt freely in all directions. The rotor shaft (5a) runs through a hole in the centre of the non-rotating swash plate (7). The hole has an inner size adjusted to a sphere slice, and a sphere element with a slightly smaller diameter than the sphere slice is mounted on the rotor shaft holder (5b). This prevents the non-rotating swash plate (7) from playing around the rotor shaft holder (5b) and provides it with slack-free tilt movements. The sphere element, however, can slide up and down the rotor shaft holder (5b) to facilitate vertical movements of the non-rotating swash plate (7).

The swash plate (7) further rests upon and is connected to servo bars (8). In the case of the embodiment of FIG. 1, there are three servo bars (8), one at each side of the centre axis of the aircraft in front of the swash plate (7), and one at the centre axis behind the swash plate (7). The servo bars (8) comprise a screw and a cylindrical nut that fits into each other. When the screw rotates in the clockwise direction, the cylindrical nut is pulled downwards, and when the screw rotates in the counter-clockwise direction, the cylindrical nut is pushed upwards. The lower part of the screw has a permanent magnet part and is rotationally connected to a circular servo bar basement (9) fixed to the aircraft, the servo bar basement (9) comprises a number of electric coils distributed around the screw adjusted to turn the screw dependent on the current load variation in the coils. Since the swash plate (7) can move up or down as well as tilt in all directions, a movement in one of the servo bars (8) will make the swash plate (7) tilt accordingly in the plane expanded by the moving servo bar my and the centre axis of the swash plate (7).

By proper movements of the servo bars (8), e.g. controlled by remote sticks, the present embodiment of the rotor system allows for controlling of roll, pitch and lift of the aircraft to which it is mounted. To provide pitch of the aircraft, the blade pitch must be on its maximum in the right rotational angle so that maximum force from the rotor is applied on the aircraft approximately at the centre axis of the aircraft. Due to gyroscopic effects, this occurs some degrees in the rotational plane after the abovementioned rotational angle. This is called phase lag and varies with the geometry and weight of the rotor system but is never more than ninety degrees. Correspondingly, to provide roll of the aircraft, the blade pitch must be increased in the right rotational angle so that maximum force from the rotor is applied on the aircraft on the lateral axis of the aircraft.

When the swash plate (7) is tilted, the blade pitch will vary as the rotor rotates. When the wheel (6) passes the high part of the swash plate (7), the inner blade tip (1c) will be pushed upwards providing an increased blade pitch due to the blade's rotation about the longitudinal blade pitch hinge. The force between the metal lip (3) and the magnetic disc (4) will contribute to press the inner blade tip (1c) down and keep the wheel (6) in touch with the swash plate (7). As the blade pitch increases and the metal lip (3) moves away from the magnetic disc (4), this magnetic force will decrease. The aerodynamic force acting on the airfoil section (1a) of the rotor blade will, however, increase as the blade pitch is getting larger. The aerodynamic force is acting in the opposite direction of the magnetic force but it is acting on the rotor blade (1) behind the blade pitch hinge axis while the magnetic force acting in front of this axis. Hence, if the blade pitch is increases the magnetic force will decrease but the aerodynamic force will instead increase, and together these two forces will provide a substantively constant valve effect on the pitch hinge keeping the wheel (6) stably rolling on the swash plate (7), thereby connecting the swash plate's movements to the blade pitch.

It is, however, important to point out that in a rotor operating at relatively high blade pitch angles the aerodynamic forces alone could be sufficient to keep the wheel (6) stably rolling on the swash plate (7) and therefore it is possible to build a rotor system according to the present invention without employing the magnetic force described above.

As can be seen from FIG. 1, the angle between the rotational axis of the wheel (6) and the longitudinal axis of the rotor blade (1) determines on which rotor position (rotational angle) the blade pitch respond to a tilt movement of the swash plate (7). Further, when having three servo bars (8) as in this embodiment, the roll is mainly controlled by the relative movements between the two servo bars (8a), (8b) on each side of the centre axis of the aircraft, and the pitch is mainly controlled by the relative movements between the servo bar (8c) on the centre axis of the aircraft and the two servo bars (8a), (8b) on each side of the centre axis together.

Figure 4:
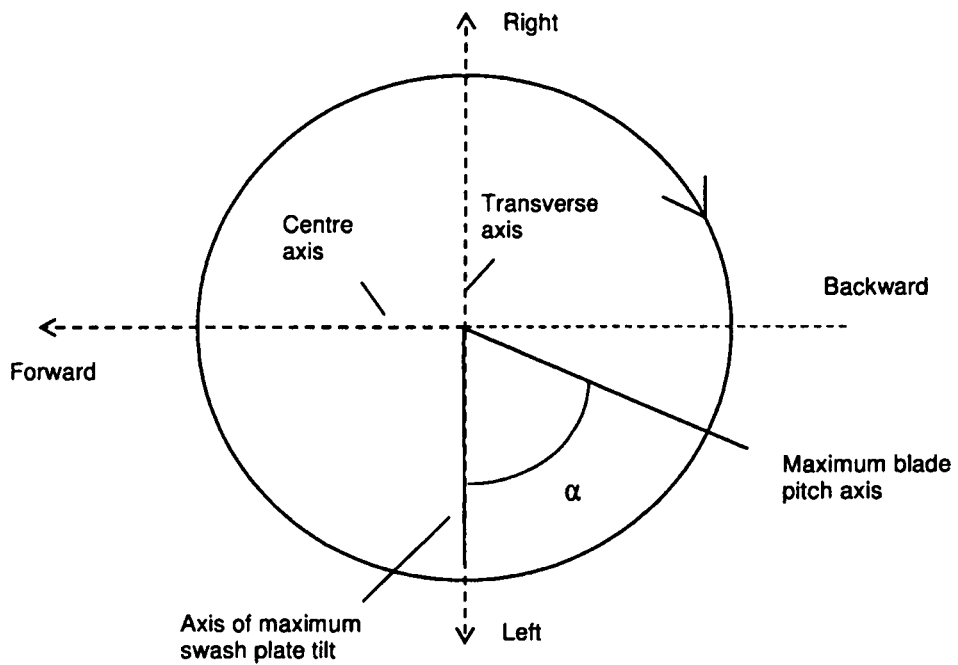
FIG. 4 is a schematic view in the rotational plane of the relation between the axis of maximum swash plate tilt and the axis of maximum blade pitch in a rotor assembly according to the present invention while rolling to the right.

In order to make the aircraft roll, the swash plate (7) must be tilted around the centre axis of the plate (7). For rolling to the right, the left side half of the plate (7) has to be tilted upwards, while the right side half has to be tilted downwards, assuming a rotor rotation in the clock wise direction. This occurs when the left side servo bar (8a) is in a high position, while the right side servo bar (8b) is in a low position. The wheels (6) of the rotor blades (1) will in this situation be in their highest position when passing the transverse axis on the left side of the aircraft. At this point, the associated rotor blade (1) reaches maximum blade pitch. The position of the rotor blade (1) in the rotational plane is determined by the angle (α) between the wheel rotational axis and the longitudinal blade axis. This is illustrated in FIG. 4. This angle should be approximately the same as the phase lag of the rotor system. On any rotor system there is a delay between the point in rotation where a change in blade pitch is introduced and the point where the desired change is manifest in the rotor blade's flight. This phenomenon is what is referred to as phase lag. The lag varies with the geometry of the rotor system. When α is approximately the same as the rotor assembly's phase lag, the maximum rotor blade displacement originated from the blade pitch about α degrees earlier in the rotation will occur at the transversal axis of the aircraft, and it will then roll to the right. The corresponding will occur when the right side half of the plate (7) is tilted upwards, while the left side half is tilted downwards, but with the result that the aircraft rolls to the left.

Figure 5:
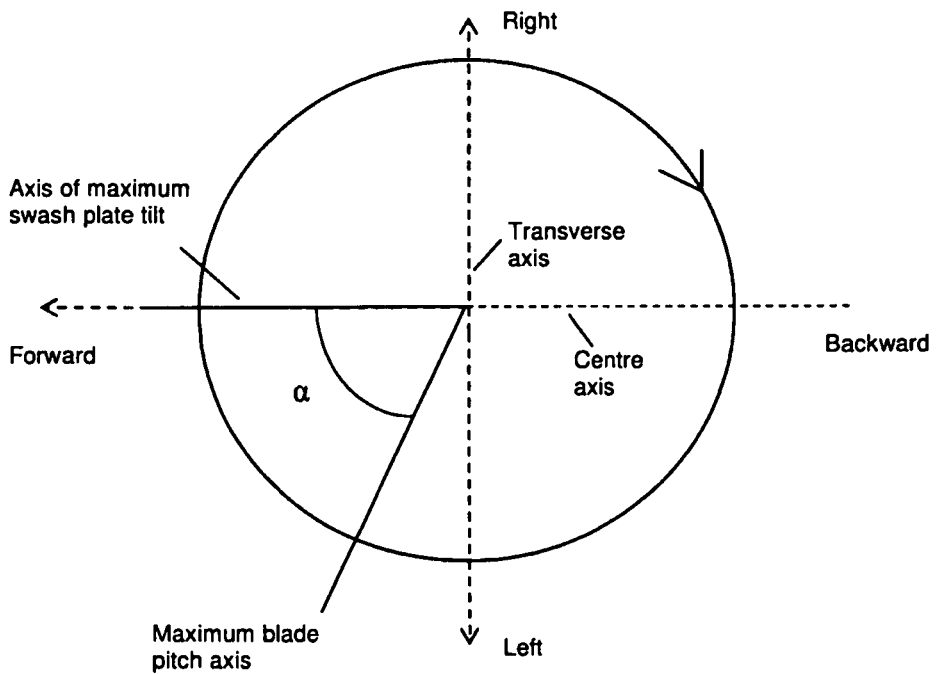
FIG. 5 is a schematic view in the rotational plane of the relation between the axis of maximum swash plate height and the axis of maximum blade pitch in a rotor assembly according to the present invention while pitching up.

In order to make the aircraft pitch, the swash plate (7) must be tilted around the traverse axis of the aircraft. For pitching upwards, the frontal half of the plate (7) has to be tilted upwards, while the rear half has to be tilted downwards provided a rotor rotation in the clock wise direction. This occurs when the two frontal servo bars (8a), (8b) are in high position, while the rear servo bar (8c) is in a low position. The wheels (6) of the rotor blades (1) will in this situation be in their highest position when passing the longitudinal axis in front of the aircraft. At this point, the associated rotor blade (1) reaches maximum blade pitch. The position of the rotor blade (1) in the rotational plane is determined by the angle (α) between the wheel axis and the longitudinal blade axis. This is illustrated in FIG. 5. This angle should be approximately the same as the phase lag of the rotor system as discussed above. When α is approximately the same as the rotor assembly's phase lag, the maximum force originated from blade pitch about a degrees earlier in the rotation will occur at the longitudinal axis in front of the aircraft, and it will then pitch upwards. The corresponding will occur when the rear half of the plate (7) is tilted upwards, while the frontal half is tilted downwards, but with the result that the aircraft pitches downwards.

If, in an alternative embodiment of the present invention, the servo bars (8) are controlled by a microcontroller with the ability to mix the roll and pitch input signals and create new control outputs to the coils in the servo bar basement (9) the position of the three servos can be shifted around the rotor shaft holder (5b) to better facilitate mechanical design preferences. This kind of electronic mixing could also be used to adjust the control signals in case the rotor's phase lag is different from the angle (α) between the wheel rotational axis and the longitudinal blade axis.

In order to make the aircraft climb, the whole swash plate (7) must be pushed up, and this occurs when all the servo bars (8) are controlled into a high position. Then the wheels (6) of the rotor blades (1) also will be in a high position around the entire swash plate (7), resulting in a higher collective blade pitch during the whole rotation of the rotor. This again provides increased lifting force acting on the aircraft not only at certain sectors of the rotation plane, but continuously during the whole rotation. This higher collective blade pitch will make the aircraft climb, and may be a substitute or supplement to increasing rotational speed of the rotor.

The embodiment referred to in the description above is only one among many implementation of the rotor within the scope of the present invention. For example, the rotor could be provided with more than two rotor blades, as long as the angle between the rotational axis of the wheels and the longitudinal axis of the associated rotor blades are equal for all the blades.

Both fewer than three and more than three servo bars could be provided allowing a blade pitch mixing where the interaction among the bars creates the required tilting of the swash plate. If only two servos are used typically roll and pitch but no vertical movements are controlled. Further, the force acting on the inner blade tip to press the wheel against the swash plate can be provided by a spring or similar means instead of the metal lip and the magnetic disc. The same effect can in some instances also be provided solely by the aerodynamic force working on the rotor blade in case the rotor is operated at relatively high blade pitch angles.

In alternative embodiments the wheel at the inner blade tip can be substituted by different guide members. If e.g. a skid covered by a low friction material is mounted in the place of the wheel and the upper surface of the swash plate is also covered by a low friction material the skid could simply slide on the swash plate as the rotor rotates. Any movements in the swash plate would be transformed to changing blade pitch via the skid on the inner blade tip. Alternative ways of lowering the friction could be by using magnetic materials with opposite polarization in the guide member and in the swash plate to enable the guide member to "float" on top of the swash plate without being in direct contact.

In yet another alternative embodiment of the present invention, the rotor head is not fixed to the rotor shaft but hinged to it with a flapping hinge having a hinge axis perpendicular both to the longitudinal blade axis and to the rotor shaft axis. This embodiment enables the rotor blades to flap freely with respect to the rotor shaft. In order for the flapping to not also affect the blade pitch angle, the angle (α) between the wheel's rotational axis going through the center of the rotor head and the longitudinal blade axis should be around 90 degrees.

The invention claimed is:
1. A rotor assembly comprising:
a rotor shaft and at least two rotor blades coupled to a rotor head that is connected to the rotor shaft, the rotor blades each having an inner blade tip and each extending outwards from the rotor shaft;
a non-rotating swash plate defining a centre through which the rotor shaft runs, the non-rotating swash plate being adjusted to tilt around all of its radial axis;
a respective pitch hinge for each rotor blade connecting said respective rotor blade to the rotor head wherein a hinge axis which the pitch hinge rotates around is generally parallel to and is positioned in front of the longitudinal centre axis of the respective rotor blade in the rotational direction; and
a respective guide member for each rotor blade connected to an inner blade tip of which, said inner blade tip being positioned in front of the hinge axis in the rotational direction and said guide member being adjusted to be in direct contact with and follow an upper surface of the non-rotating swash plate when the rotor assembly rotates,
wherein aerodynamic and magnetic forces are applied on the rotor blades sufficiently strong to maintain the pitch hinge pressing the guide member downwards against the non-rotating.
2. The rotor assembly according to claim 1, wherein each rotor blade consists of an airfoil section, a blade hinge part and the inner blade tip, and the rotor head consists of a rotor head inner part and one rotor head hinge part for each respective rotor blade.

3. The rotor assembly according to claim 2, wherein each respective pitch hinge consists of the blade hinge part and a rotor head hinge part hinged together in a hinge axis generally parallel to the longitudinal axis of the respective rotor blade.

4. The rotor assembly according to claim 2, wherein each guide member consist of a wheel having a rotational axis generally concurrent to a radial line of the non-rotating swash plate and rolling on the upper surface of the swash plate when the rotor assembly rotates.

5. The rotor assembly according to claim 2, further comprising a metal lip mounted on top of the inner blade tip and extending above a corresponding magnetic member mounted on the rotor head, the metal lip being positioned so that the part of the metal lip extending above the magnetic member lies parallel just upon the magnetic member when the blade is in a maximum negative blade pitch position.

6. The rotor assembly according to claim 1, further comprising three or more control bars which the non-rotating swash plate rests upon and is connected to, being vertically movable and able to actuating tilt movements in the swash plate thereby controlling roll, pitch and lift of an aircraft to which the rotor assembly is mounted.

7. The rotor assembly according to claim 6, wherein the three or more control bars are three servo bars, two of them parallel positioned on each side of a centre axis of the rotor assembly and one on the centre axis of the rotor assembly on the opposite side of the centre of the non-rotating swash plate.

8. The rotor assembly according to claim 7, wherein each of the three or more servo bars comprises a screw and a cylindrical nut that fit into each other, the cylindrical nut being connected to the non-rotating swash plate and the screw being rotationally connected to a circular servo bar basement fixed to an aircraft, the servo bar basement comprising a number of coils distributed around the screw adjusted to turn the screw dependent on the current load variation in the coils.

9. A rotor assembly comprising:
a rotor shaft and at least two rotor blades coupled to a rotor head that is connected to the rotor shaft, the rotor blades each having an inner blade tip and each extending outwards from the rotor shaft;
a non-rotating swash plate defining a centre through which the rotor shaft runs, the non-rotating swash plate being adjusted to tilt around all of its radial axis;
a respective pitch hinge for each rotor blade connecting said respective rotor blade to the rotor head wherein a hinge axis which the pitch hinge rotates around is generally parallel to and is positioned in front of the longitudinal centre axis of the respective rotor blade in the rotational direction;
a respective guide member for each rotor blade connected to an inner blade tip of which, said inner blade tip being positioned in front of the hinge axis in the rotational direction and said guide member being adjusted to be in direct contact with and follow an upper surface of the non-rotating swash plate when the rotor assembly rotates; and
a metal lip mounted on the top of the inner blade tip and extending above a corresponding magnetic member mounted on the rotor head, the metal lip being positioned so that the part of the metal lip extending above the magnetic member lies parallel just upon the magnetic member when the blade is in a maximum negative blade pitch position,
the rotor assembly being adjusted to rotate in a certain rotational direction; and
one or more forces applied on the rotor blades are sufficiently strong to press the guide members on the pitch hinge downwards against the non-rotating swash plate, movements of the non-rotating swash plate being transferred to blade pitch movements of the rotor blades.

10. A rotor assembly comprising:
a rotor shaft and at least two rotor blades coupled to a rotor head that is connected to the rotor shaft, the rotor blades each having an inner blade tip and each extending outwards from the rotor shaft;
a non-rotating swash plate defining a centre through which the rotor shaft runs, the non-rotating swash plate being adjusted to tilt around all of its radial axis;
a respective pitch hinge for each rotor blade connecting said respective rotor blade to the rotor head wherein a hinge axis which the pitch hinge rotates around is generally parallel to and is positioned in front of the longitudinal centre axis of the respective rotor blade in the rotational direction;
a respective guide member for each rotor blade connected to an inner blade tip of which, said inner blade tip being positioned in front of the hinge axis in the rotational direction and said guide member being adjusted to be in direct contact with and follow an upper surface of the non-rotating swash plate when the rotor assembly rotates; and
at least three servo bars which the non-rotating swash plate rests upon and is connected to, being vertically movable and able to actuate tilt movements in the swash plate thereby controlling roll, pitch, and lift of an aircraft on which the rotor assembly is mounted, two of the at least three servo bars being positioned parallel on each side of a centre axis of the rotor assembly and one of the at least three servo bars being positioned on the centre axis of the rotor assembly on the opposite side of the centre of the non-rotating swash plate, each of the at least three servo bars including a screw and a cylindrical nut that fit into each other, the cylindrical nut being connected to the non-rotating swash plate and the screw being rotationally connected to a circular servo bar basement fixed to an aircraft, the servo bar basement including a number of coils distributed around the screw adjusted to turn the screw dependent on the current load variation in the coils,
the rotor assembly being adjusted to rotate in a certain rotational direction; and
one or more forces applied on the rotor blades are sufficiently strong to press the guide members on the pitch hinge downwards against the non-rotating swash plate, movements of the non-rotating swash plate being transferred to blade pitch movements of the rotor blades.

* * * * *